US006786491B2

(12) United States Patent
Carbonneau

(10) Patent No.: US 6,786,491 B2
(45) Date of Patent: Sep. 7, 2004

(54) QUICK TOOL COUPLER ADAPTED TO A SLIDING HAMMER

(76) Inventor: Marc Carbonneau, 12122, Evergreen, Tecumseh (CA), N8N 1G9

( * ) Notice: Subject to any disclaimer, the term of this patent is extended or adjusted under 35 U.S.C. 154(b) by 0 days.

(21) Appl. No.: 10/113,484

(22) Filed: Apr. 2, 2002

(65) Prior Publication Data

US 2003/0184030 A1 Oct. 2, 2003

(51) Int. Cl.[7] .................................... B23B 31/113
(52) U.S. Cl. ..................... 279/89; 279/93; 81/27
(58) Field of Search ............. 279/89, 93; 403/348–349; 173/90; 81/27; 29/254

(56) References Cited

U.S. PATENT DOCUMENTS 1,294,304 A * 2/1919 Pittman ...................... 403/349
1,903,548 A * 4/1933 Kreis .......................... 29/254
2,157,153 A * 5/1939 Troche ........................ 403/349
3,036,482 A * 5/1962 Kenworthy et al. .......... 173/90
3,423,781 A * 1/1969 Henson ...................... 403/781
5,109,739 A * 5/1992 Hull et al. ..................... 81/463
5,245,737 A * 9/1993 Perea .......................... 29/247
5,365,648 A * 11/1994 Fuga ........................... 29/254
5,934,139 A * 8/1999 Tucker ......................... 72/479
6,125,719 A * 10/2000 Lowther et al. ............... 81/27
6,126,359 A * 10/2000 Dittrich et al. ............. 403/349
6,374,660 B1 * 4/2002 Palmgren ................... 72/481.1
6,398,136 B1 * 6/2002 Smith ......................... 239/600

* cited by examiner

*Primary Examiner*—Daniel W. Howell

(57) ABSTRACT

The present disclosure relates to a quick tool coupler adapted to a sliding hammer allowing quick change of its tools.

1 Claim, 4 Drawing Sheets

QUICK TOOL COUPLER ADAPTED TO A SLIDING HAMMER

BACKGROUND OF THE INVENTION

1. Field of the Invention

The present invention relates to a quick tool coupler adapted to a sliding hammer allowing quick change of its tools.

2. Description of the Related Art

A search of prior art records has unveiled the following patents:

1. CA 1,051,178 issued in 1979 to Brookover;
2. U.S. Pat. No. 4,376,385 issued in 1983 to Davis;
3. U.S. Des. Pat. No. 272,798 issued in 1984 to York;
4. U.S. Pat. No. 5,329,802 issued in 1994 to Nunez;
5. U.S. Des. Pat. No. 356,475 issued in 1995 to Boylan;
6. U.S. Pat. No. 5,085,281 issued in 1992 to Selly;
7. U.S. Pat. No. 5,109,739 issued in 1992 to Hull and al.;
8. U.S. Pat. No. 5,727,418 issued in 1998 to Strozier;
9. U.S. Pat. No. 5,365,648 issued in 1994 to Fuga; and
10. U.S. Pat. No. 6,125,719 issued in 2000 to Lowther and al.

The patents to Fuga and Lowther are probably the most relevant.

It is well known to provide a sliding hammer with threaded tools for a multitude of technical applications. No sliding hammer or apparatus sold at the present on the market resolves the problem of tool coupling with effectiveness and simplicity the way this quick tool coupler does.

SUMMARY OF THE INVENTION

The gist of the invention is therefore to provide a simple, strong and effective way to quickly couple tools and/or apparatus together.

BRIEF DESCRIPTION OF THE SEVERAL VIEWS OF THE DRAWING(S)

FIGS. 4*a*, 4*b*, 4*c*, 4*d*, 4*e* and 4*f* show various male part tools that can be connected to the quick tool coupler.

DETAILED DESCRIPTION OF THE INVENTION

Figure 1:
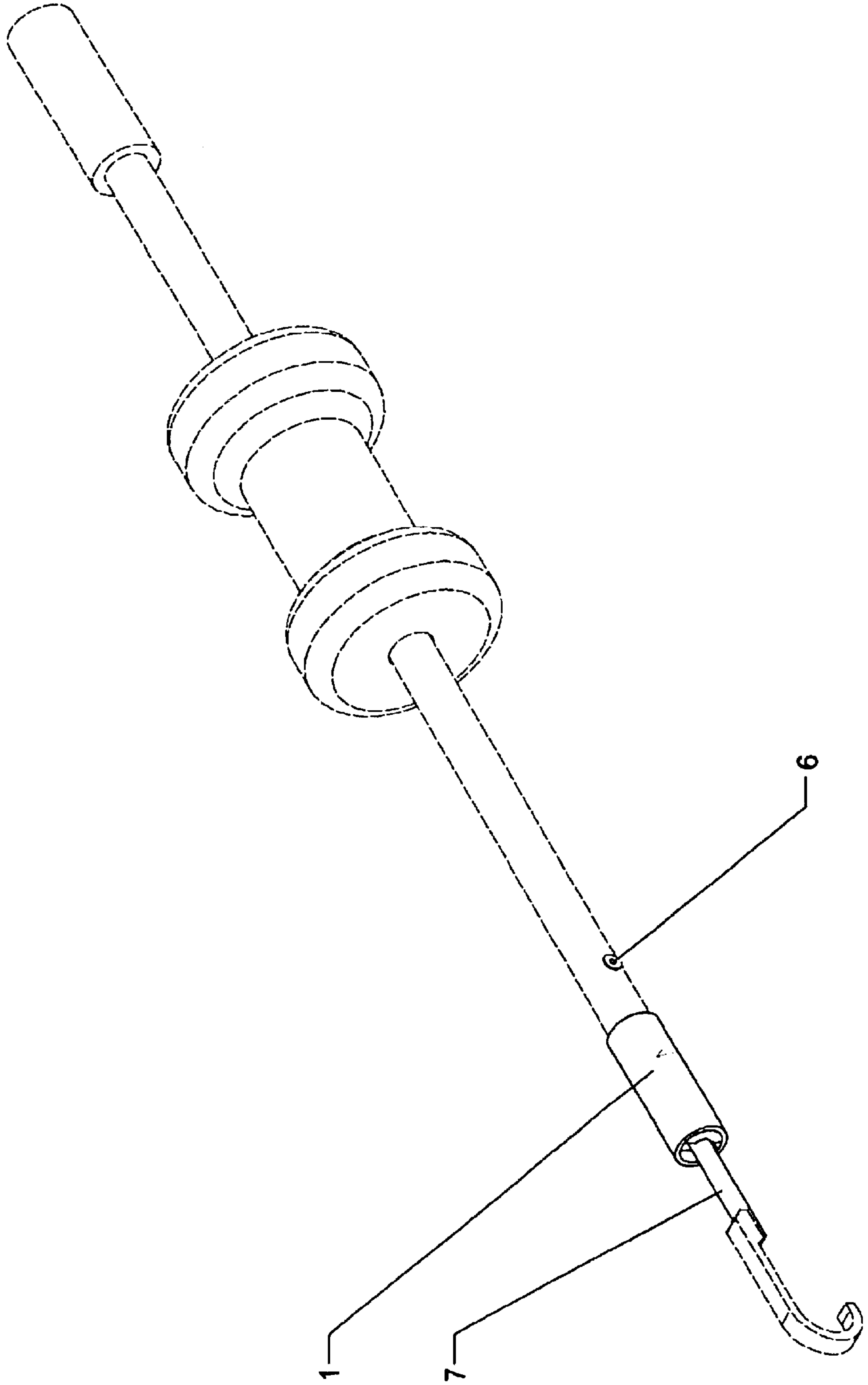
FIG. 1 shows a perspective view of a quick tool coupler adapted to a sliding hammer as shown in phantom lines.
Figure 2:
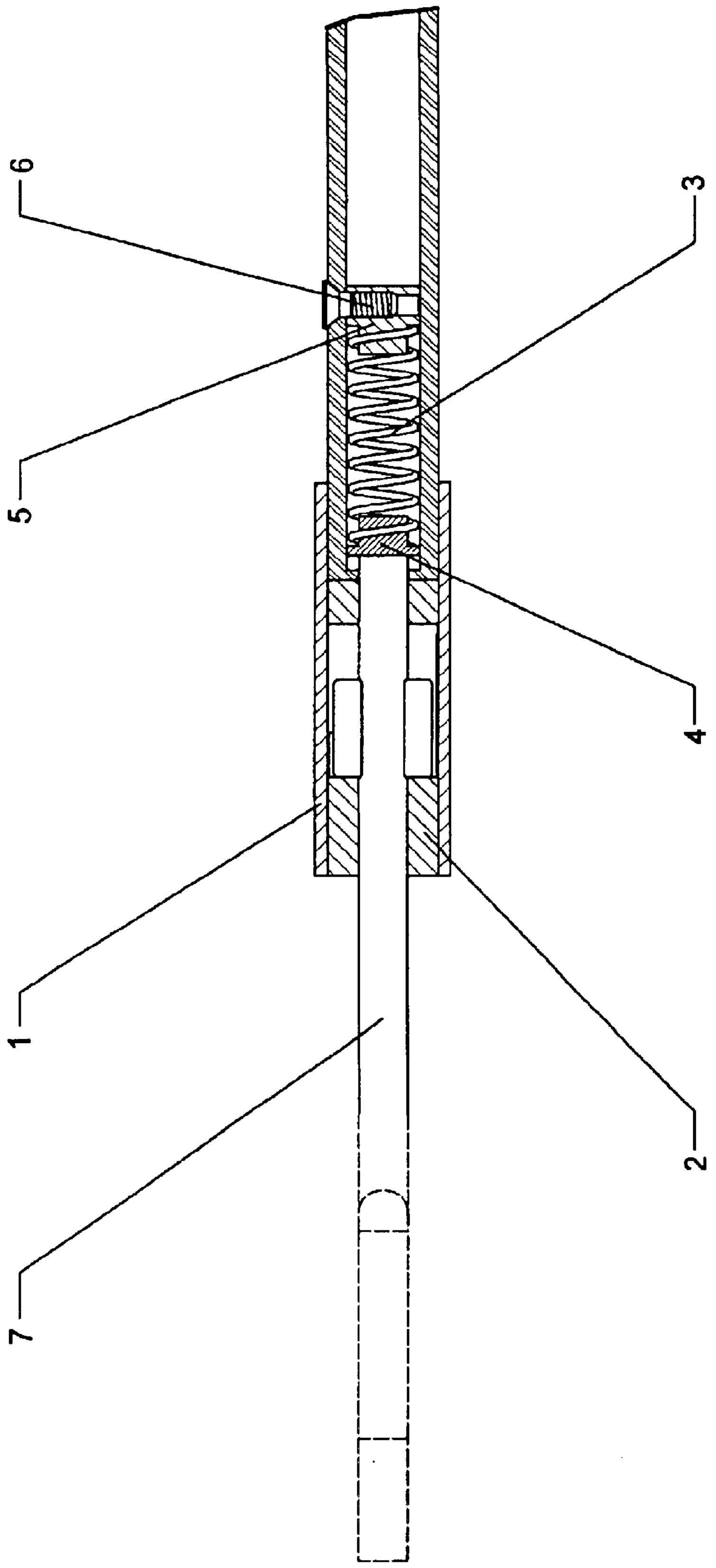
FIG. 2 shows a cross-section view thereof.
Figure 3:
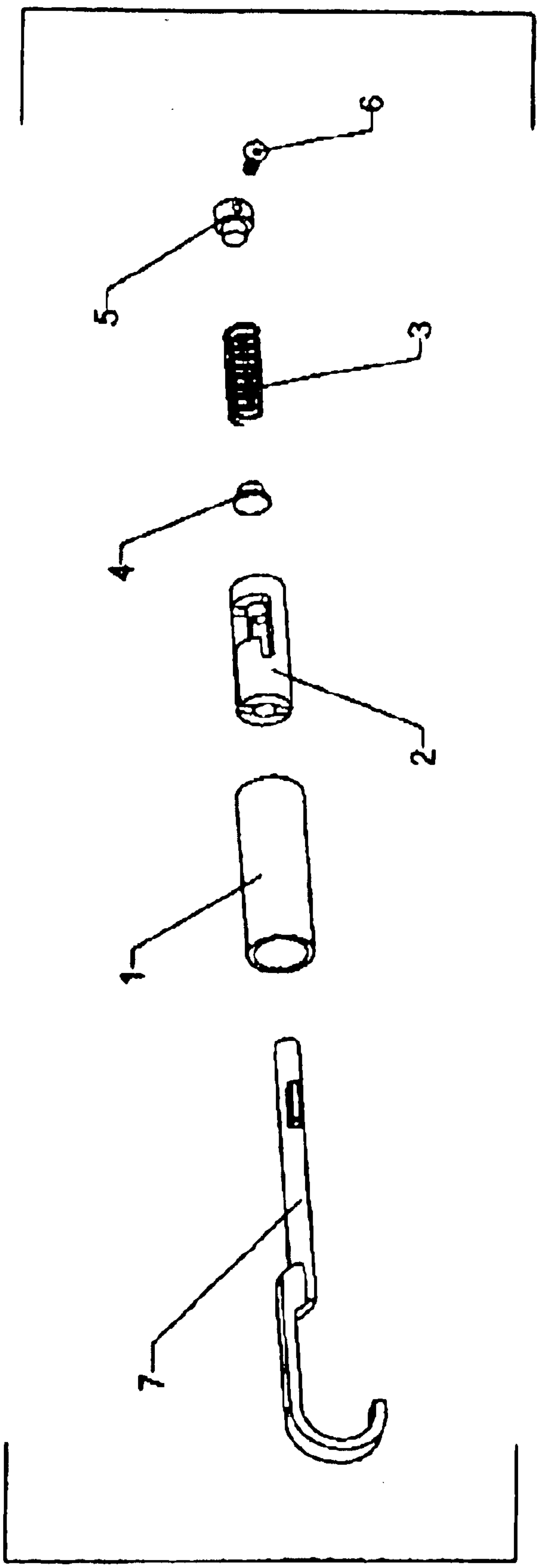
FIG. 3 shows an exploded view thereof.
Figure 4A:
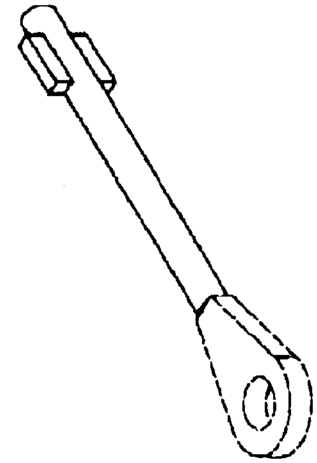
Figure 4B:
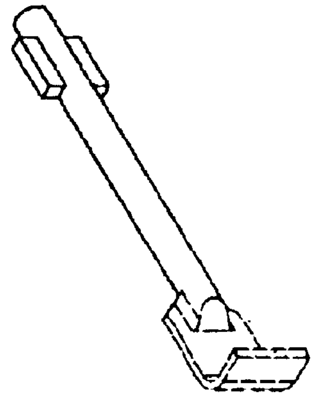
Figure 4C:
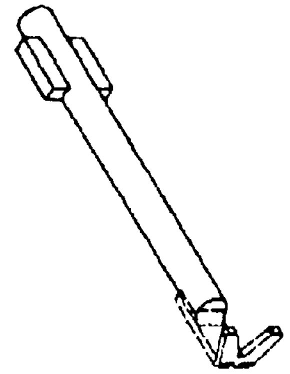
Figure 4D:
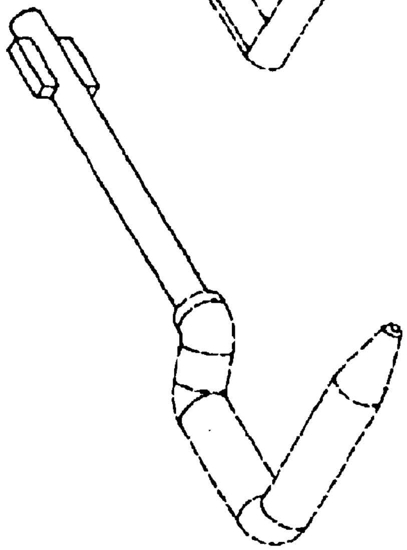
Figure 4E:
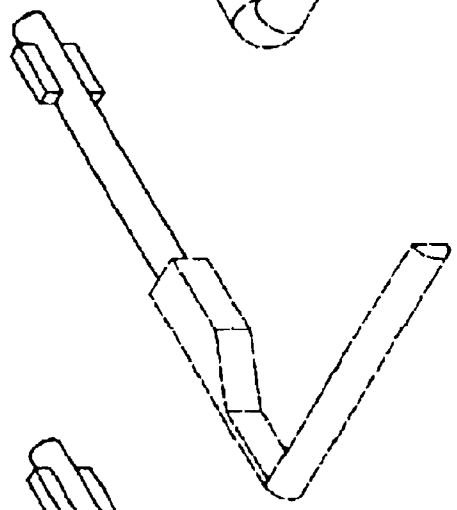
Figure 4F:
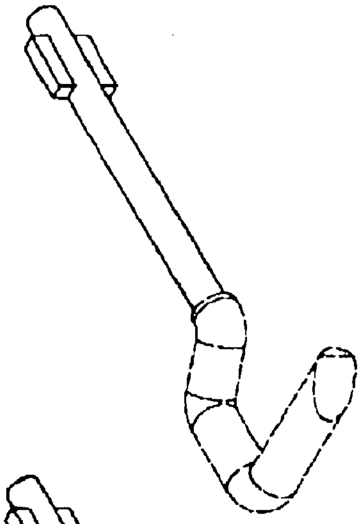

Referring to FIGS. 1 to 3, a quick tool coupler adapted to a sliding hammer as shown in phantom lines, which comprises a male part tool (7) engaged inside a female part (2) mounted inside a reinforced cylinder (1), and which is blocked in position by a spring (3) mounted between a compressor (4) and a retainer member (5) including an aperture in which is engaged a threaded screw (6) for blocking the retainer member (5) and spring (3) inwardly shaft of sliding hammer. A tubular member is located axially rearward of the female part, and the compressor, spring, and retainer member are located within this tubular member.

As shown in FIGS. 4*a*, 4*b*, 4*c*, 4*d*, 4*e* and 4*f* various male part tools (7) can be connected to the quick tool coupler.

Although only a single embodiment of the present invention has been described and illustrated, the present invention is not limited to the features of this embodiment, but includes all variations and modifications within the scope of claims.

What is claimed is:

1. A sliding hammer having a quick change tool coupler, comprising a tool having a male part, a female part on the sliding hammer for reception of the male part, a reinforcing cylinder located around the female part, a spring for biasing the male part into a blocked position within the female part, the spring being located within a tubular member located axially rearward of the female part, a compressor located within the tubular member and biased by the spring against an anally rearward end of the male part, the rear end of the spring being seated on a retainer member also located within the tubular member, a screw extending radially through the tubular member to secure the retainer member in place.

* * * * *